(12) United States Patent
Yun et al.

(10) Patent No.: US 12,291,273 B2
(45) Date of Patent: May 6, 2025

(54) PANEL ASSEMBLY FOR VEHICLE

(71) Applicants: Hyundai Motor Company, Seoul (KR); Kia Corporation, Seoul (KR)

(72) Inventors: Hyun Cheol Yun, Seoul (KR); Hyung Gyu Park, Anyang-si (KR); Jin Young Mo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 108 days.

(21) Appl. No.: 17/867,987

(22) Filed: Jul. 19, 2022

(65) Prior Publication Data

US 2023/0182822 A1 Jun. 15, 2023

(30) Foreign Application Priority Data

Dec. 15, 2021 (KR) .......................... 10-2021-0179796

(51) Int. Cl.
*B62D 25/08* (2006.01)
*B62D 25/02* (2006.01)
*B62D 25/06* (2006.01)
*B62D 27/02* (2006.01)

(52) U.S. Cl.
CPC ............. *B62D 25/08* (2013.01); *B62D 25/02* (2013.01); *B62D 25/06* (2013.01); *B62D 27/02* (2013.01); *B62D 27/023* (2013.01)

(58) Field of Classification Search
CPC ........ B62D 25/02; B62D 25/08; B62D 25/06; B62D 33/04; B62D 33/046; B62D 31/003; B62D 23/00; B62D 23/005; B62D 27/02; B62D 27/023; B62D 27/06

USPC ................. 296/19, 181–0.3, 185.1, 186.1, 296/193.04–0.09, 193.12, 203.01–0.04, 296/205

See application file for complete search history.

(56) References Cited

U.S. PATENT DOCUMENTS

| | | | | |
|---|---|---|---|---|
| 11,667,177 | B2* | 6/2023 | Singer | B60J 7/026 296/100.03 |
| 2010/0026037 | A1* | 2/2010 | Opie | B60J 7/062 296/100.18 |
| 2020/0331245 | A1 | 10/2020 | Seo et al. | |

FOREIGN PATENT DOCUMENTS

| | | |
|---|---|---|
| KR | 10-2020-0050681 A | 5/2020 |
| KR | 20200122605 A | 10/2020 |
| KR | 10-2021-0069994 A | 6/2021 |
| KR | 10-2021-0070806 A | 6/2021 |
| KR | 10-2021-0070811 A | 6/2021 |

* cited by examiner

*Primary Examiner* — Dennis H Pedder
(74) *Attorney, Agent, or Firm* — Fox Rothschild LLP

(57) ABSTRACT

An embodiment panel assembly for a vehicle includes an inner panel configured to surround a roof, two opposite pillars, and a front side of a vehicle body of the vehicle, a first outer panel coupled to the inner panel and having a first assembling part at an end thereof, and a second outer panel coupled to surround a front side of the inner panel and having a second assembling part disposed at an end corresponding to the first assembling part and coupled to the first assembling part, wherein the first assembling part and the second assembling part are coupled to each other by fitting.

20 Claims, 8 Drawing Sheets

PANEL ASSEMBLY FOR VEHICLE

CROSS-REFERENCE TO RELATED APPLICATIONS

The present application claims the benefit of Korean Patent Application No. 10-2021-0179796, filed on Dec. 15, 2021, which application is hereby incorporated herein by reference.

TECHNICAL FIELD

The present invention relates to a technology related to a panel assembly.

BACKGROUND

A general structure of a vehicle body is manufactured by machining and welding components through a pressing process using molds. For this reason, there is a problem in that a massive amount of investment is required for facilities such as pressing factories, vehicle body welding factories, and painting factories, and a design degree of freedom is low.

In particular, in the case of the vehicle body in the related art, a large number of changes in design are required to manufacture a small number of products of various types. For this reason, there is a problem in that the number of molds is rapidly increased, which inevitably increases production costs.

Recently, it is necessary to simplify a process of manufacturing a vehicle and minimize a development period to meet customer needs and cope with quickly changing market environments in a timely manner.

Therefore, there is a need for a vehicle body structure capable of improving assembly properties of a vehicle body in a smart factory environment while coping with various types of designs.

The foregoing explained as the background is intended merely to aid in the understanding of the background of the present invention, and is not intended to mean that the present invention falls within the purview of the related art that is already known to those skilled in the art.

SUMMARY

The present invention relates to a technology related to a panel assembly. Particular embodiments relate to a technology related to an inner panel coupled to an upper body of a vehicle body and an outer panel assembly coupled to the inner panel from outside the inner panel.

Embodiments of the present invention can solve problems in the art and aim to couple an inner panel to an outer portion of a vehicle body of a vehicle including a plurality of pipes and to couple an outer panel to an outer portion of the inner panel.

The panel assembly for a vehicle according to embodiments of the present invention is a panel assembly for a vehicle coupled to outer portions of a roof and two opposite pillars of a vehicle body. The panel assembly for a vehicle may include an inner panel shaped to surround the roof, the two opposite pillars, and a front side of the vehicle body, a first outer panel configured to be loaded from above the inner panel and coupled to the inner panel so as to surround an upper portion and a side portion of the inner panel and having a first assembling part formed at a front end of the vehicle, and a second outer panel coupled to surround a front side of the inner panel and having a second assembling part positioned at an end corresponding to the first assembling part and coupled to the first assembling part. The first and second assembling parts may be coupled by fitting.

A first insertion portion may be formed on the first assembling part and recessed toward the inside of the vehicle, a first protruding portion may be formed on the second assembling part and inserted into the first insertion portion, and the first protruding portion may be fitted into the first recessed portion.

A depth of the first insertion portion may be larger than a length of the first protruding portion.

The first assembling part may include an extension portion having an end extending downward in a state of being in contact with an inner surface of the second outer panel in a state in which the first assembling part is coupled to the second assembling part.

A second insertion portion may be formed in a front surface of the inner panel and recessed inward, a second protruding portion may be formed on the second outer panel and disposed at a position corresponding to the second insertion portion, and the second protruding portion may protrude to be inserted into the second insertion portion.

An outer surface of the first outer panel and an outer surface of the second outer panel may be curved in a state in which the first outer panel and the second outer panel are fastened to each other.

The first assembling part may extend along a front end of the first outer panel, and the second assembling part may be coupled and extend to correspond to a shape in which the first assembling part extends.

A first inner fastening part may be formed outward on a roof and a side portion of the inner panel, a second inner fastening part may be formed on a front surface of the inner panel, a first outer fastening part may be formed in the first outer panel and fastened to the first inner fastening part to couple the first outer panel to the inner panel, and a second outer fastening part may be formed in the second outer panel and fastened to the second inner fastening part to couple the second outer panel to the inner panel.

The first and second inner fastening parts may have the same shape, and the first and second outer fastening parts may have the same shape.

The first and second inner fastening parts may have insertion grooves, respectively, the first and second outer fastening parts may have coupling protrusions, respectively, and the coupling protrusions may be inserted into and coupled to the insertion grooves.

An inclined portion may be formed on the coupling protrusion and have a width that decreases in an extension direction, a recessed portion may be recessed inward in the coupling protrusion and disposed at an end of the inclined portion, the coupling protrusion may be inserted into the insertion groove along the inclined portion and coupled as the insertion groove is caught by the recessed portion, an elastic rib may be formed in each of the first and second outer fastening parts, extend inward from an inner portion of the recessed portion, and provide an elastic force to the recessed portion disposed outside the elastic rib, a restriction portion may be formed in each of the first and second outer fastening parts and disposed at an end of the recessed portion, the restriction portion may extend in a direction intersecting a direction in which each of the first and second outer fastening parts extends, and the restriction portion may restrict insertion of each of the first and second outer fastening parts.

The recessed portion of the coupling protrusion may be formed in a direction parallel to a ground surface and coupled by being caught by the insertion groove, and the insertion groove may be larger in size than the coupling protrusion in a direction intersecting the ground surface.

According to the panel assembly for a vehicle according to embodiments of the present invention, the first outer panel is coupled to the roof portion and the side portion of the inner panel, the second outer panel is coupled to the front portion of the inner panel, and the first protruding portion is fitted into the first insertion portion. Therefore, it is possible to improve the coupling forces between the inner panel and the first and second outer panels.

In addition, the depth of the first insertion portion is larger than the length of the first protruding portion. Therefore, it is possible to prevent the connected first outer panel from being damaged by the extension of the first protruding portion when the second outer panel is thermally expanded.

In addition, the extension portion is formed at the end of the first assembling part and extends along the inner surface of the second outer panel. Therefore, when the first outer panel is thermally expanded, the extension portion is expanded along the inner surface of the second outer panel, which makes it possible to prevent damage to the second outer panel.

DETAILED DESCRIPTION OF ILLUSTRATIVE EMBODIMENTS

Figure 1:
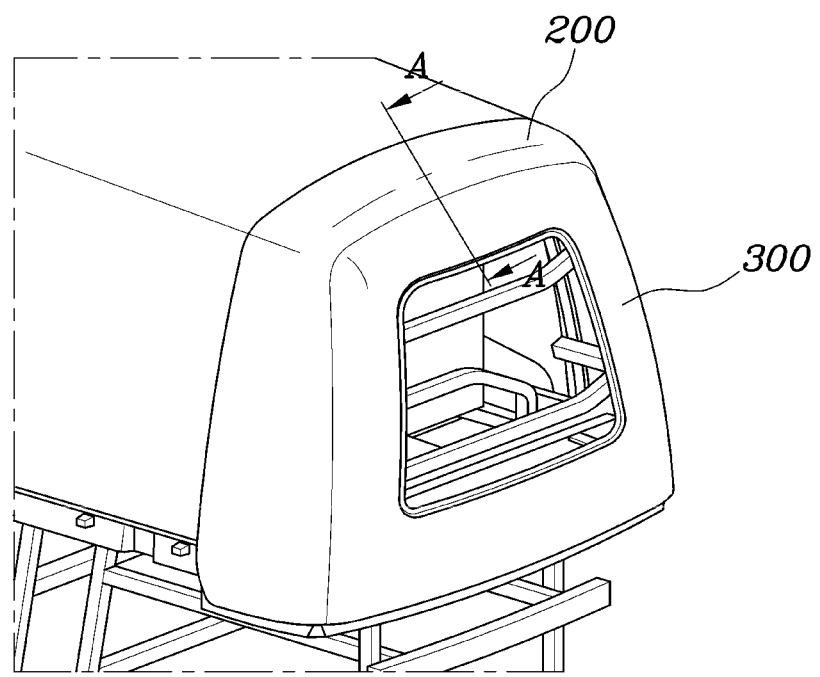
FIG. 1 is a perspective view of a panel assembly for a vehicle according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first," "second," and other numerical terms may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe specific embodiments and do not intend to limit the present invention. Singular expressions include plural expressions unless clearly described as having different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as having ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

In the related art, a process of manufacturing a vehicle is performed for a comparatively long period of time and a large amount of manufacturing cost is required to provide the vehicle with a suspension for a vehicle, exterior components, interior components, a steering system, a safety device, and the like in consideration of convenience for passengers getting into the vehicle, ride quality for the passengers, safety specifications, external appearances, traveling performance, and the like. In addition, because separate vehicles suitable for various applications need to be manufactured, there is a problem in that it is impossible to manufacture customized vehicles suitable for all applications.

The vehicle, to which the technology according to embodiments of the present invention is applied, is a business vehicle, such as a purpose-built vehicle (PBV), used for various commercial purposes such as product distribution, food trucks, delivery, and service provision. In the case of the illustrated representative embodiment, passengers are not seated in the vehicle, but only freight is loaded into an internal space of the vehicle. Further, the vehicle is driven by an autonomous driving system and used for unmanned delivery of freight or food, product distribution, and product delivery.

The vehicle according to embodiments of the present invention has a simplified structure, such that a process of designing and manufacturing the vehicle may be simplified. The advantage of the vehicle is that components of the vehicle may be modularized, such that costs may be reduced, a supply of components may be easily performed, and the vehicle may be completely manufactured by mechanically coupling the modularized components of the vehicle by bolting, riveting, or the like through production processes in an environmentally friendly smart factory without a pressing process, a vehicle body welding process, and a painting process.

Figure 6:
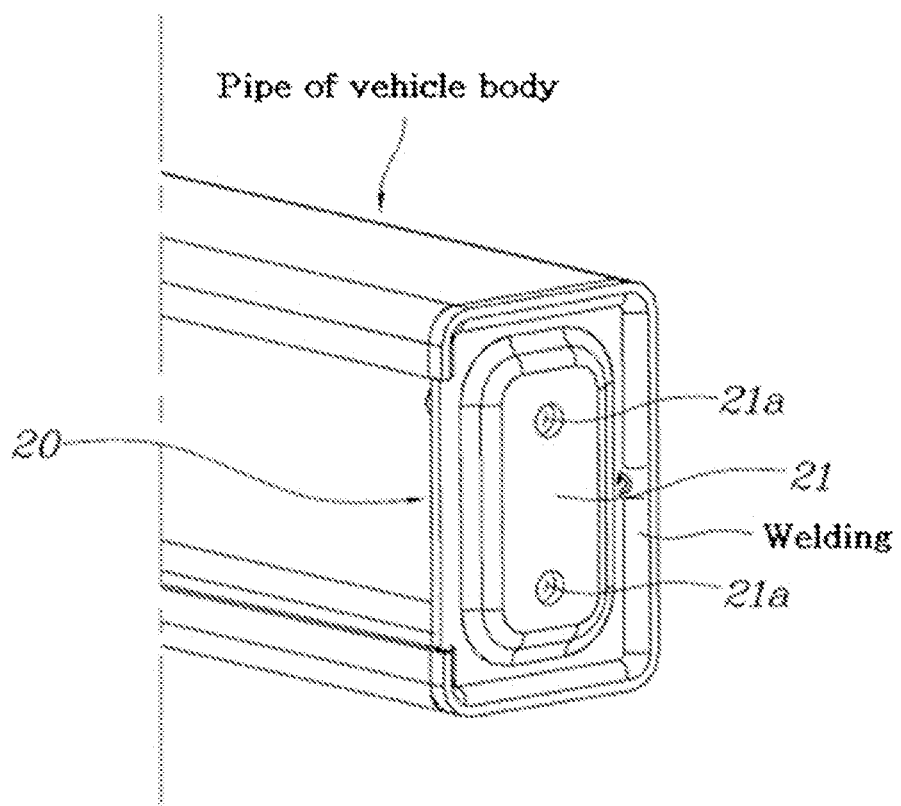
FIG. 6 is a perspective view illustrating a state in which a coupling member is coupled to a pipe end of a vehicle body according to an embodiment of the present invention.

Embodiments of the present invention relate to a method of manufacturing the vehicle body by using a plurality of pipes to reduce manufacturing costs. The pipe may be manufactured by extrusion, roll-forming, or the like, and thus the manufacturing cost is advantageously low. However, it is necessary to reinforce coupling strength at the time of coupling the pipes or coupling the pipe and other panels. Therefore, according to embodiments of the present invention, a coupling member 20 is applied to close an opened end of a pipe of a vehicle body to firmly couple an end of the pipe of the vehicle body to another pipe or a panel, and the coupling member 20 may inhibit deformation of the opened end of the pipe of the vehicle body and provide a coupling surface 21 having a coupling hole 21*a* to which another component is coupled. FIG. 6 is a perspective view illustrating a state in which the coupling member 20 is coupled to the end of a pipe of the vehicle body according to an embodiment of the present invention. As illustrated in FIG. 6, the coupling member 20 is welded in a state of being spaced apart inward from the end of the pipe in the longitudinal direction of the pipe, and a welding bead is disposed in a separation space formed to a degree to which the coupling member 20 is spaced apart inward from the pipe. Therefore, a process of removing the welding bead may be eliminated, such that an operation of integrating the coupling member 20 may be simplified. According to the structure of embodiments of the present invention in which the pipe and the coupling member 20 are integrated, the vehicle body may be easily assembled only by mechanical coupling such as bolting or riveting in the environmentally friendly smart factory, and the structure according to embodiments of the present invention may be environmentally friendly because welding or the like is not needed. Some members of the vehicle body may be easily replaced in the event of accidents or maintenance, and various types of vehicles may be easily assembled and produced.

The vehicle, to which embodiments of the present invention is applied, may be divided into a business region positioned at an upper side and configured to allow freight to be loaded thereon, and a drive region positioned at a lower side and configured to drive the vehicle. The business region may be variously changed depending on a customer's requirements, and the drive region may be variously changed depending on driving conditions of the vehicle.

The vehicle according to the illustrated embodiments is basically designed to have a structure in which a door is opened only at one side and a space in which freight may be loaded is opened. The business region may be designed to have various shapes depending on the customer's requirements.

The upper body for a vehicle according to embodiments of the present invention constitutes the vehicle body positioned in the business region of the vehicle for an unmanned delivery system.

The upper body and a lower body are assembled by assembling a plurality of pipe members by bolting, such that the vehicle may be easily manufactured, repaired, and rebuilt. A lower portion of the upper body constitutes a floor. A drive motor, wheels, suspension systems, a battery, and the like may be mounted at front and rear sides of the lower body. In addition, an additional battery may be mounted at a center of the lower body, or a freight space may be defined at the center of the lower body. Further, the upper body and the lower body are separately assembled and then fastened to each other in an upward/downward direction, thereby constituting a vehicle body of the completely manufactured vehicle. Therefore, various combinations of upper and lower bodies may be assembled.

In addition, inner panels 100 are coupled to the upper body and the lower body by simple mechanical coupling, such as bolting or riveting, or fitting between members. Outer panels are coupled to outer portions of the inner panels 100 and define an external appearance of a vehicle. The outer panel may be coupled to the inner panel 100 by simple mechanical coupling, such as bolting or riveting, or fitting between members.

A panel assembly for a vehicle according to embodiments of the present invention has a structure for coupling the inner panel 100 and the outer panel to the vehicle body.

Figure 2:
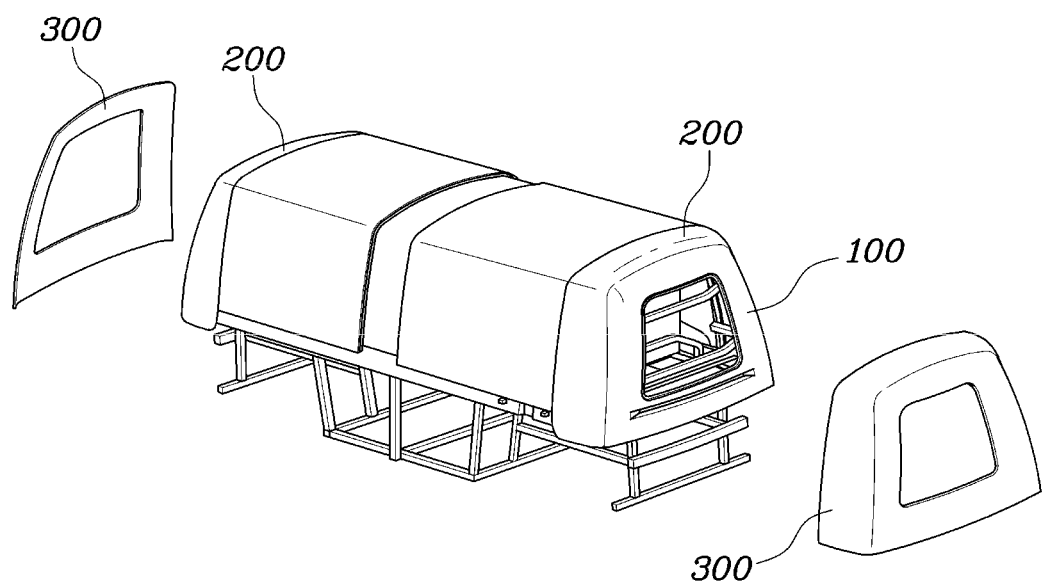
FIG. 2 is a view illustrating a process of coupling second outer panels of the panel assembly for a vehicle according to an embodiment of the present invention.
Figure 3:
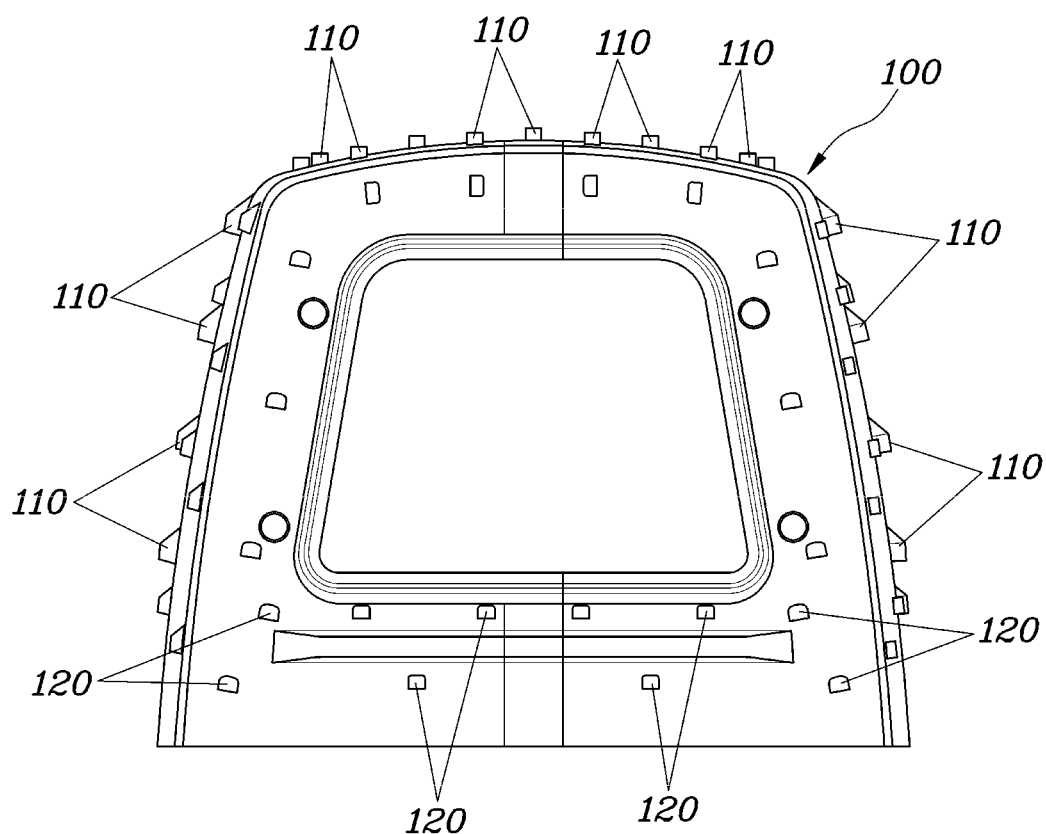
FIG. 3 is a view illustrating an inner panel of the panel assembly for a vehicle according to an embodiment of the present invention.
Figure 4:
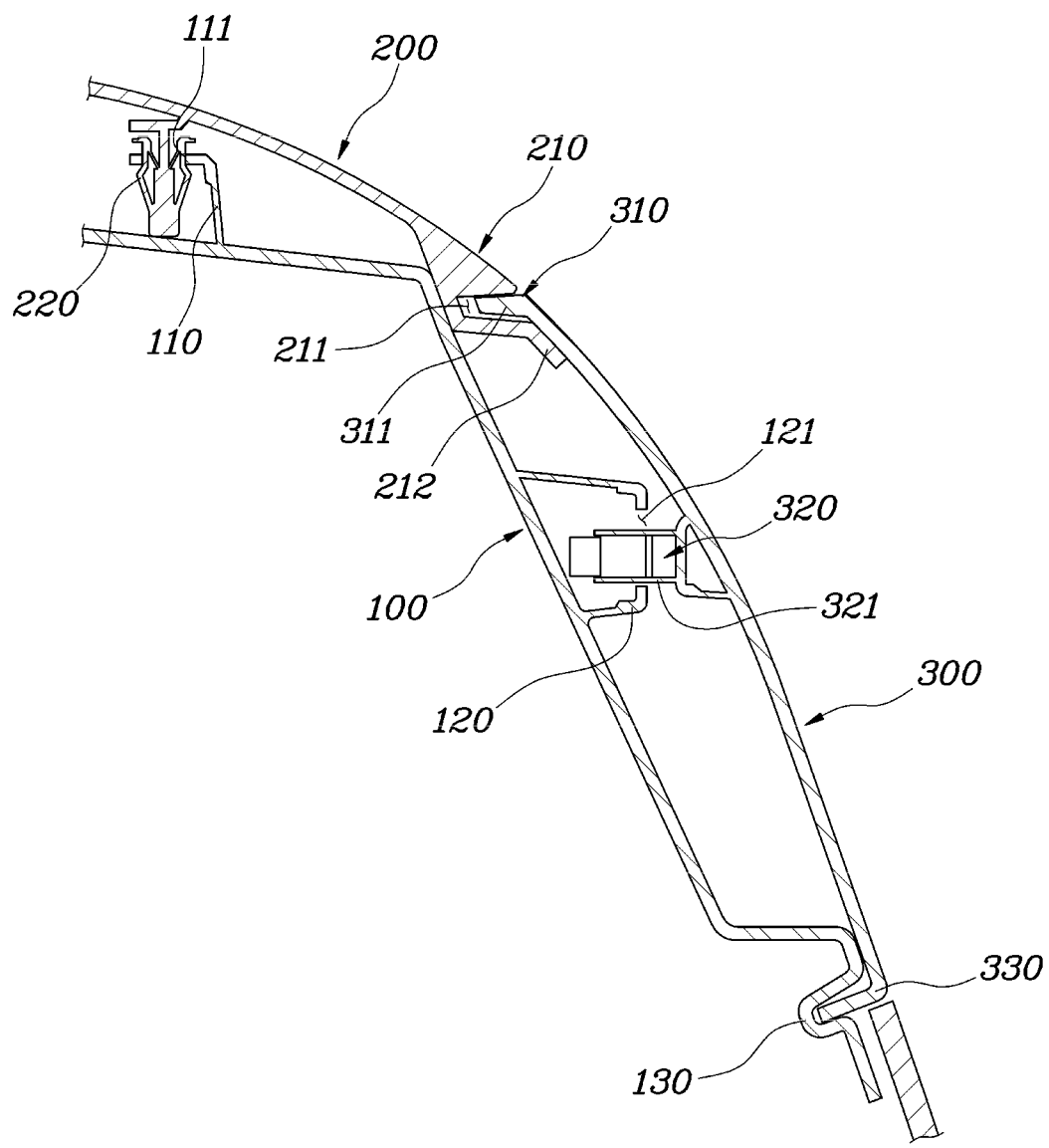
FIG. 4 is a cross-sectional view taken along line A-A in FIG. 1.

FIG. 1 is a perspective view of a panel assembly for a vehicle according to an embodiment of the present invention, FIG. 2 is a view illustrating a process of coupling second outer panels 300 of the panel assembly for a vehicle according to an embodiment of the present invention, FIG. 3 is a view illustrating the inner panel 100 of the panel assembly for a vehicle according to an embodiment of the present invention, and FIG. 4 is a cross-sectional view taken along line A-A in FIG. 1.

An exemplary embodiment of the panel assembly for a vehicle according to the present invention will be described with reference to FIGS. 1 to 4.

The panel assembly for a vehicle according to embodiments of the present invention is a panel assembly for a vehicle coupled to outer portions of a roof and two opposite pillars of a vehicle body. The panel assembly for a vehicle may include an inner panel 100 shaped to surround the roof, the two opposite pillars, and a front side of the vehicle body, a first outer panel 200 configured to be loaded from above the inner panel 100 and coupled to the inner panel 100 so as to surround an upper portion and a side portion of the inner panel 100 and having a first assembling part 210 formed at a front end of the vehicle, and a second outer panel 300 coupled to surround a front side of the inner panel 100 and having a second assembling part 310 positioned at an end corresponding to the first assembling part 210 and coupled to the first assembling part 210. The first and second assembling parts 210 and 310 may be coupled by fitting.

As illustrated in FIGS. 2 and 3, the vehicle body of the vehicle may be bent and protrude upward at the front and rear sides thereof to define the two opposite pillars and the roof. The inner panels 100 are positioned at the front and rear sides of the vehicle and are formed to surround the front side of the vehicle, the roof portions, and two side portions of each of the pillars of the vehicle disposed at the front and rear sides of the vehicle. The inner panel may be made by coupling two panels.

The first outer panel 200, which is coupled to surround the roof portion and the side portion of the inner panel 100, is connected to the inner panel 100 so as to be loaded from above to below. The second outer panel 300, which is coupled to surround a front portion of the inner panel 100, may be loaded from a location in front of the inner panel 100 and coupled to the front portion of the inner panel 100, as illustrated in FIG. 2.

The first assembling part 210 is provided at the end of the first outer panel 200 and fitted with the second assembling part 310. The second assembling part 310 is provided on the second outer panel 300 and disposed at a position corresponding to the first assembling part 210 and fitted with the first assembling part 210. Therefore, when the first outer panel 200 is coupled to the inner panel 100 and the second outer panel 300 is coupled to the inner panel 100, the first and second assembling parts 210 and 310 may be coupled to each other by fitting.

Therefore, it is possible to increase coupling forces between the inner panel 100 and the first and second outer panels 200 and 300. In addition, it is possible to improve the external aesthetic appearance of the vehicle by removing a level difference between the first and second outer panels 200 and 300.

A first insertion portion 211 may be formed in the first assembling part 210 and recessed toward the inside of the vehicle, a first protruding portion 311 may be formed on the second assembling part 310 and inserted into the first insertion portion 211, and the first protruding portion 311 may be inserted into a first recessed portion 323.

As illustrated in FIG. 4, the first insertion portion 211 may be formed in the first assembling part 210 and recessed toward the interior of the vehicle, and the first protruding portion 311 may be formed on the second assembling part 310. The first protruding portion 311 may protrude toward the first insertion portion 211 and be inserted into the first insertion portion 211.

Therefore, the first outer panel 200 is coupled to the inner panel 100 first, the second outer panel 300 is coupled to the front portion of the inner panel 100, and the first protruding portion 311 is fitted into the first insertion portion 211, such that the end of the first outer panel 200 and the end of the second outer panel 300 may be fitted with each other.

Since the end of the first outer panel 200 and the end of the second outer panel 300 are fitted with each other, a level difference between the first and second outer panels 200 and 300 may be removed, which makes it possible to improve the external aesthetic appearance of the vehicle.

In addition, the first outer panel 200 is coupled to the roof portion and the side portion of the inner panel 100, the second outer panel 300 is coupled to the front portion of the inner panel 100, and the first protruding portion 311 is fitted into the first insertion portion 211. Therefore, it is possible to improve the coupling forces between the inner panel 100 and the first and second outer panels 200 and 300.

A depth of the first insertion portion 211 may be larger than a length of the first protruding portion 311.

As illustrated in FIG. 4, the depth of the first insertion portion 211 may be larger than a length by which the first protruding portion 311 protrudes. Therefore, an available space may be formed in the first insertion portion 211 in the state in which the first protruding portion 311 is inserted into the first insertion portion 211.

The first and second outer panels 200 and 300 may be made of synthetic resin and positioned outside the vehicle. For this reason, there is a problem in that the ends of the first and second outer panels 200 and 300 are thermally expanded and extended outward because of outside weather.

To solve the problem, the depth of the first insertion portion 211 is larger than the length of the first protruding portion 311, such that the available space is formed. When the first protruding portion 311 is extended as the second outer panel 300 is thermally expanded, the first protruding portion 311 may be guided into the available space in the first insertion portion 211. That is, even though the first protruding portion 311 is thermally expanded and extended, the first protruding portion 311 is guided into the available space in the first insertion portion 211 without being exposed to the outside. Therefore, a gap between the first and second outer panels 200 and 300 may be constantly maintained.

Therefore, it is possible to prevent the connected first or second outer panel 200 or 300 from being damaged by the end of the second outer panel 300 that is expanded when the second outer panel 300 is thermally expanded.

The first assembling part 210 may include an extension portion 212 having an end extending downward in a state of being in contact with an inner surface of the second outer panel 300 in the state in which the first assembling part 210 is coupled to the second assembling part 310.

As illustrated in FIG. 4, the extension portion 212 may be provided at the end of the first assembling part 210. The extension portion 212 is in contact with the inner surface of the second outer panel 300 and extends in a direction in which the inner surface of the second outer panel 300 extends.

When the first outer panel 200 is thermally expanded, the end of the first assembling part 210 may be expanded. For this reason, there is concern that the second outer panel 300 will be damaged.

To avoid the concern, the extension portion 212 may be provided at the end of the first assembling part 210 and extend in the direction in which the inner surface of the second outer panel 300 extends. The extension portion 212 may be expanded along the inner surface of the second outer panel 300.

Therefore, it is possible to prevent the connected second outer panel 300 from being damaged by the expansion of the end of the first outer panel 200 when the first outer panel 200 is thermally expanded.

A second insertion portion 130 recessed inward may be formed in a front surface of the inner panel 100, and a second protruding portion 330 may be formed on the second outer panel 300 and disposed at a position corresponding to the second insertion portion 130. The second protruding portion 330 may protrude to be inserted into the second insertion portion 130.

As illustrated in FIGS. 3 and 4, the second insertion portion 130 recessed inward may be formed in the front portion of the inner panel 100, and the second protruding portion 330 may be formed in the second outer panel 300 and disposed at the position corresponding to the second insertion portion 130. The second protruding portion 330 may protrude and be inserted into the second insertion portion 130.

Therefore, the second outer panel 300 may be easily coupled to the inner panel 100 by fitting, and a level difference between the inner panel 100 and the second outer panel 300 may be removed.

An outer surface of the first outer panel 200 and an outer surface of the second outer panel 300 may have a curved shape in a state in which the first and second outer panels 200 and 300 are fastened to each other.

As illustrated in FIGS. 1 and 4, the first and second outer panels 200 and 300 may be coupled to each other as the first and second assembling parts 210 and 310 are fitted with each other. Therefore, the outer surface of the first outer panel 200 and the outer surface of the second outer panel 300 may have a curved shape by being coupled to each other.

Since the first and second assembling parts 210 and 310 are fitted with each other, a level difference at a connection portion between the first and second outer panels 200 and 300 may be removed, such that the inflow of foreign substances from the outside may be prevented, thereby preventing damage to the inner panel 100 or the vehicle body. Since the outer surface of the first outer panel 200 and the outer surface of the second outer panel 300 are curved, air resistance may be reduced.

The first assembling part 210 may extend along a front end of the first outer panel 200, and the second assembling part 310 may be coupled and extend to correspond to a shape in which the first assembling part 210 extends.

The first and second assembling parts 210 and 310 may extend along the ends of the first and second outer panels 200 and 300 being in contact with each other, such that both of the ends of the first and second outer panels 200 and 300 may extend.

Since both the first outer panel 200 and the second outer panel 300 are connected to each other by fitting, a portion between the first and second outer panels 200 and 300 may be sealed, such that the external aesthetic appearance may be improved.

A first inner fastening part 110 may be formed outward on the roof portion and the side portion of the inner panel 100, and a second inner fastening part 120 may be formed on the front surface of the inner panel. A first outer fastening part 220 may be formed in the first outer panel 200 and fastened to the first inner fastening part 110 to couple the first outer panel 200 to the inner panel 100, and a second outer fastening part 320 may be formed in the second outer panel 300 and fastened to the second inner fastening part 120 to couple the second outer panel 300 to the inner panel 100.

The first inner fastening part 110 may be formed outward on the roof portion and the side portion of the inner panel 100, and the first outer fastening part 220 may be formed on the first outer panel 200, fastened to the first inner fastening part 110, and disposed at the position at which the first inner fastening part 110 is formed, such that the inner panel 100 and the first outer panel 200 may be fastened to each other.

The second inner fastening part 120 may be formed outward on the front portion of the inner panel 100, and the second outer fastening part 320 may be formed on the second outer panel 300, fastened to the second inner fastening part 120, disposed at the position at which the second inner fastening part 120 is formed, such that the inner panel 100 and the second outer panel 300 may be fastened to each other.

The first inner fastening part 110 and the first outer fastening part 220 may be formed in various shapes. In addition, the second inner fastening part 120 and the second outer fastening part 320 may be formed in various shapes.

The following description is related to embodiments of the first inner fastening part 110, the first outer fastening part 220, the second inner fastening part 120, and the second outer fastening part 320.

Figure 5:
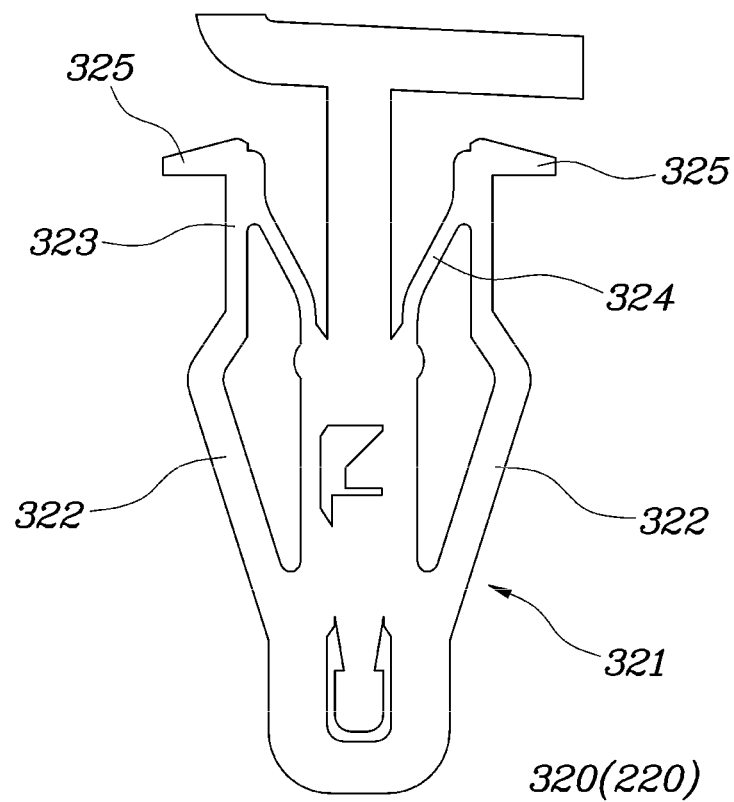
FIG. 5 is a cross-sectional view illustrating a first outer fastening part and a second outer fastening part of the inner panel of the panel assembly for a vehicle according to an embodiment of the present invention.

FIG. 5 is a cross-sectional view illustrating the first and second outer fastening parts 220 and 320 of the inner panel 100 of the panel assembly for a vehicle according to an embodiment of the present invention.

The first and second inner fastening parts 110 and 120 may have the same shape, and the first and second outer fastening parts 220 and 320 may have the same shape.

Since the first and second inner fastening parts 110 and 120 have the same shape and the first and second outer fastening parts 220 and 320 have the same shape, the same coupling method may be applied, which may simplify an operator's work and reduce costs required to manufacture molds.

Insertion grooves 111 and 121 may be formed in the first and second inner fastening parts 110 and 120, respectively, the first and second outer fastening parts 220 and 320 may include coupling protrusions 321, respectively, and the coupling protrusions 321 may be inserted into and coupled to the insertion grooves 111 and 121, respectively.

As illustrated in FIG. 5, the insertion grooves 111 and 121 having groove shapes may be formed in the first and second inner fastening parts 110 and 120, and the coupling protrusions 321 may be formed on the first and second outer fastening parts 220 and 320 and protrude to be inserted into the insertion grooves 111 and 121, such that the coupling protrusions 321 are inserted into the insertion grooves 111 and 121, and the first inner assembling part and the first outer assembling part may be coupled to each other.

Therefore, the first and second inner fastening parts 110 and 120 and the first and second outer fastening parts 220 and 320 may be fitted with and coupled to one another without a separate coupling member such as a bolt or rivet.

An inclined portion 322 may be formed on the coupling protrusion 321 and have a width that decreases in an extension direction, and a recessed portion 323 may be recessed inward in the coupling protrusion 321 and disposed at an end of the inclined portion 322. The coupling protrusion 321 may be inserted into the insertion groove 111 or 121 along the inclined portion 322 and coupled as the insertion groove 111 or 121 is caught by the recessed portion 323.

As illustrated in FIG. 5, the second inclined portion 322 may be formed on the coupling protrusion 321 and inclined toward the end of the coupling protrusion 321, and the recessed portion 323 is recessed from the end of the inclined portion 322 toward a center of the coupling protrusion 321. Therefore, the coupling protrusion 321 is inserted into the insertion portion, and the insertion groove is caught by the recessed portion, such that the coupling protrusion 321 and the insertion portion may be coupled to each other.

Therefore, the coupling protrusion 321 may be fixed in a state of being inserted into the insertion portion without separating from the insertion portion.

Elastic ribs 324 may be formed in the first and second outer fastening parts 220 and 320, respectively. The elastic rib 324 may extend inward from an inner portion of the recessed portion 323 and provide an elastic force to the recessed portion 323 disposed outside the elastic rib 324.

As illustrated in FIG. 5, the elastic rib 324 may extend inward from the recessed portion 323 in a diagonal direction toward a central portion of the first or second outer fastening part 220 or 320 and provide elasticity to the recessed portion 323. The elasticity may fix the coupling protrusion 321 by being applied when the first or second inner fastening part 110 or 120 is caught by the recessed portion 323 after the coupling protrusion 321 is inserted into the insertion groove 111 or 121.

As illustrated in FIG. 5, a restriction portion 325 may be formed in the first or second outer fastening part 220 or 320 and disposed at the end of the recessed portion 323. The restriction portion 325 may extend in a direction intersecting the direction in which the first or second outer fastening part 220 or 320 extends. The restriction portion 325 may restrict the insertion of the first or second outer fastening part 220 or 320.

The restriction portion 325 may extend outward from the end of the recessed portion 323 and prevent the coupling protrusion 321 from being inserted into the insertion groove 111 or 121 any further, which makes it possible to prevent the first and second outer panels 200 and 300 from swaying in the state in which the first and second outer panels 200 and 300 are coupled to the inner panel 100.

Figure 7:
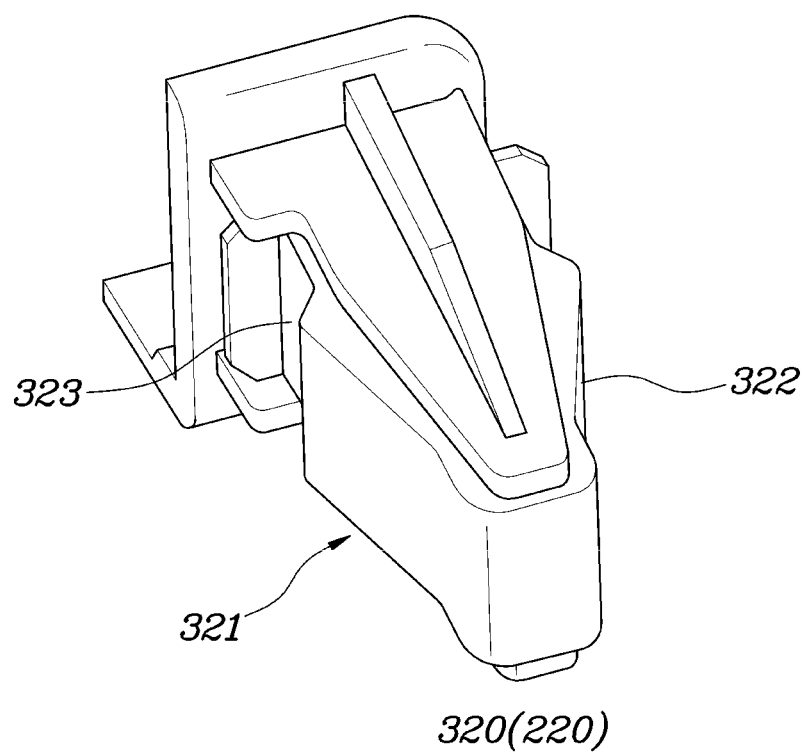
FIG. 7 is a perspective view illustrating the first outer fastening part and the second outer fastening part of the inner panel of the panel assembly for a vehicle according to an embodiment of the present invention.
Figure 8:
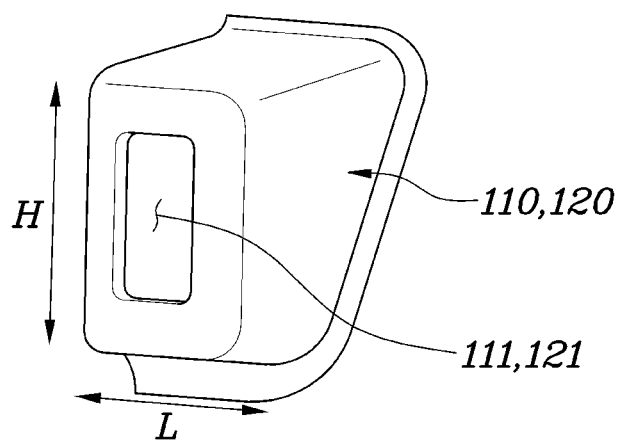
FIG. 8 is a perspective view illustrating a first inner fastening part and a second inner fastening part of the inner panel of the panel assembly for a vehicle according to an embodiment of the present invention.

FIG. 7 is a perspective view illustrating the first and second outer fastening parts 220 and 320 of the inner panel of the panel assembly for a vehicle according to an embodiment of the present invention, and FIG. 8 is a perspective view illustrating the first and second inner fastening parts 110 and 120 of the inner panel 100 of the panel assembly for a vehicle according to an embodiment of the present invention.

Referring further to FIGS. 7 and 8, the recessed portion 323 of the coupling protrusion 321 is formed in a direction parallel to the ground surface and coupled by being caught by the insertion groove 111 or 121. The insertion groove 111 or 121 may be larger in size than the coupling protrusion 321 in a direction intersecting the ground surface.

As illustrated in FIG. 7, the recessed portion 323 formed in the coupling protrusion 321 may be formed in a horizontal direction (direction L in FIG. 8) parallel to the ground surface and may be in contact, in the horizontal direction, with the insertion groove 111 or 121 of the first or second inner fastening part 110 or 120 illustrated in FIG. 8. The insertion groove 111 or 121 is larger in size than the coupling protrusion 321 in a vertical direction (direction H in FIG. 8) intersecting the horizontal direction, such that a separation space may be formed in the vertical direction H after the coupling protrusion 321 inserted into the insertion groove 111 or 121.

Therefore, even though the coupling protrusion 321 is expanded by heat, the coupling protrusion 321 may be expanded into the separation space formed in the vertical direction H in the insertion groove, thereby preventing damage to the coupling protrusion 321 or the insertion grooves 111 and 121.

According to the panel assembly of the vehicle, the respective panels are coupled to one another by fitting and coupled to the vehicle body by bolting or riveting. According to the assembly method, the respective panels are manufactured and transported to a smart factory, and the vehicles are manufactured by a simple coupling method such as fitting, bolting, or riveting in the smart factory without a manufacturing process such as a pressing process or a painting process, and then delivered to customers. Therefore, it is possible to simplify the manufacturing process and minimize the manufacturing costs.

While the specific embodiments of the present invention have been illustrated and described above, it will be obvious to those skilled in the art that the present invention may be variously modified and changed without departing from the technical spirit of the present invention defined in the appended claims.

What is claimed is:

1. A panel assembly for a vehicle, the panel assembly comprising:
   an inner panel configured to surround a roof, two opposite pillars, and a front side of a vehicle body of the vehicle;
   a first outer panel coupled to the inner panel and having a first assembling part at an end thereof; and
   a second outer panel coupled to surround a front side of the inner panel and having a second assembling part disposed at an end corresponding to the first assembling part and coupled to the first assembling part, wherein the first assembling part and the second assembling part are coupled to each other by fitting.

2. The panel assembly of claim 1, further comprising a first insertion portion on the first assembling part and recessed toward an inside of the vehicle, and a first protruding portion on the second assembling part and inserted into the first insertion portion, wherein the first protruding portion is fitted into the first insertion portion.

3. The panel assembly of claim 2, wherein a depth of the first insertion portion is larger than a length of the first protruding portion.

4. The panel assembly of claim 1, wherein the first assembling part comprises an extension portion having an end extending downward in a state of being in contact with an inner surface of the second outer panel in a state in which the first assembling part is coupled to the second assembling part.

5. The panel assembly of claim 1, further comprising a second insertion portion in a front surface of the inner panel and recessed inward, and a second protruding portion on the second outer panel and disposed at a position corresponding to the second insertion portion, wherein the second protruding portion protrudes to be inserted into the second insertion portion.

6. The panel assembly of claim 1, wherein an outer surface of the first outer panel and an outer surface of the second outer panel are curved in a state in which the first outer panel and the second outer panel are fastened to each other.

7. The panel assembly of claim 1, wherein the first assembling part extends along a front end of the first outer panel, and wherein the second assembling part is coupled to the first assembling part and extends to correspond to a shape in which the first assembling part extends.

8. A panel assembly for a vehicle, the panel assembly comprising:
   an inner panel configured to surround a roof, two opposite pillars, and a front side of a vehicle body of the vehicle, the inner panel comprising:
   a first inner fastening part disposed outward on a roof and a side portion of the inner panel; and
   a second inner fastening part on a front surface of the inner panel;
   a first outer panel coupled to the inner panel and having a first assembling part at an end thereof, the first outer panel comprising a first outer fastening part fastened to the first inner fastening part to couple the first outer panel to the inner panel; and
   a second outer panel coupled to surround a front side of the inner panel, the second outer panel comprising:

a second assembling part disposed at an end corresponding to the first assembling part and coupled to the first assembling part; and a second outer fastening part fastened to the second inner fastening part to couple the second outer panel to the inner panel, wherein the first assembling part and the second assembling part are coupled to each other by fitting.

9. The panel assembly of claim 8, wherein the first inner fastening part and the second inner fastening part have the same shape, and wherein the first outer fastening part and the second outer fastening part have the same shape.

10. The panel assembly of claim 9, wherein:
the first inner fastening part and the second inner fastening part have insertion grooves, respectively;
the first outer fastening part and the second outer fastening part have coupling protrusions, respectively; and
the coupling protrusions are inserted into and coupled to the insertion grooves.

11. The panel assembly of claim 10, wherein:
an inclined portion is formed on the coupling protrusions and has a width that decreases in an extension direction;
a recessed portion is recessed inward in the coupling protrusions and disposed at an end of the inclined portion;
the coupling protrusions are inserted into the insertion grooves along the inclined portion and coupled as the insertion grooves are caught by the recessed portion;
an elastic rib is formed in each of the first outer fastening part and the second outer fastening part, wherein the elastic rib extends inward from an inner portion of the recessed portion and is configured to provide an elastic force to the recessed portion disposed outside the elastic rib; and
a restriction portion is formed in each of the first outer fastening part and the second outer fastening part and is disposed at an end of the recessed portion, wherein the restriction portion extends in a direction intersecting a direction in which each of the first outer fastening part and the second outer fastening part extends, and wherein the restriction portion is configured to restrict insertion of each of the first outer fastening part and the second outer fastening part.

12. The panel assembly of claim 11, wherein the recessed portion of the coupling protrusions is disposed in a direction parallel to a ground surface and is coupled by being caught by the insertion grooves, and wherein the insertion grooves are larger in size than the coupling protrusions in a direction intersecting the ground surface.

13. A vehicle comprising:
a vehicle body comprising an upper body, a lower body coupled to the upper body, a roof, and two opposite pillars;
an inner panel surrounding the roof, the two opposite pillars, and a front side of the vehicle body;
a first outer panel coupled to the inner panel and having a first assembling part at an end thereof; and
a second outer panel coupled to surround a front side of the inner panel and having a second assembling part disposed at an end corresponding to the first assembling part and coupled to the first assembling part, wherein the first assembling part and the second assembling part are coupled to each other by fitting.

14. The vehicle of claim 13, further comprising a first insertion portion on the first assembling part and recessed toward an inside of the vehicle, and a first protruding portion on the second assembling part and inserted into the first insertion portion, wherein the first protruding portion is fitted into the first recessed insertion.

15. The vehicle of claim 14, wherein a depth of the first insertion portion is larger than a length of the first protruding portion.

16. The vehicle of claim 13, wherein the first assembling part comprises an extension portion having an end extending downward in a state of being in contact with an inner surface of the second outer panel in a state in which the first assembling part is coupled to the second assembling part.

17. The vehicle of claim 13, further comprising a second insertion portion in a front surface of the inner panel and recessed inward, and a second protruding portion on the second outer panel and disposed at a position corresponding to the second insertion portion, wherein the second protruding portion protrudes to be inserted into the second insertion portion.

18. The vehicle of claim 13, wherein an outer surface of the first outer panel and an outer surface of the second outer panel are curved in a state in which the first outer panel and the second outer panel are fastened to each other.

19. The vehicle of claim 13, wherein the first assembling part extends along a front end of the first outer panel, and wherein the second assembling part is coupled to the first assembling part and extends to correspond to a shape in which the first assembling part extends.

20. The vehicle of claim 13, further comprising:
a first inner fastening part disposed outward on a roof and a side portion of the inner panel;
a second inner fastening part disposed on a front surface of the inner panel;
a first outer fastening part disposed in the first outer panel and fastened to the first inner fastening part to couple the first outer panel to the inner panel; and
a second outer fastening part disposed in the second outer panel and fastened to the second inner fastening part to couple the second outer panel to the inner panel.

* * * * *